United States Patent
Hasama et al.

(10) Patent No.: US 9,784,318 B2
(45) Date of Patent: Oct. 10, 2017

(54) ROLLING BEARING APPARATUS

(71) Applicant: JTEKT CORPORATION, Osaka-shi, Osaka (JP)

(72) Inventors: Kenta Hasama, Kashiwara (JP); Hajime Watanabe, Kashiwara (JP); Kiyoshi Tanimoto, Kashiwara (JP); Koichi Sakurai, Kawasaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/168,385

(22) Filed: May 31, 2016

(65) Prior Publication Data

US 2016/0356314 A1 Dec. 8, 2016

(30) Foreign Application Priority Data

Jun. 5, 2015 (JP) ................................. 2015-114924

(51) Int. Cl.
*F16C 33/66* (2006.01)
*F16N 9/02* (2006.01)
(Continued)

(52) U.S. Cl.
CPC ........ *F16C 33/6659* (2013.01); *F16C 33/586* (2013.01); *F16C 33/6648* (2013.01); *F16N 9/02* (2013.01); *F16N 13/00* (2013.01); *F16C 19/163* (2013.01); *F16C 33/6681* (2013.01); *F16C 2322/39* (2013.01)

(58) Field of Classification Search
CPC .......................... F16C 19/163; F16C 33/5896; F16C 33/6648; F16C 33/6659; F16C 33/586; F16C 33/6651; F16C 33/6655; F16C 33/6681; F16C 37/007; F04B 23/05;
(Continued)

(56) References Cited

U.S. PATENT DOCUMENTS 7,153,030 B2 * 12/2006 Katsuzawa ......... F16C 33/6618
384/462
7,293,919 B2 * 11/2007 Ueno ..................... F04B 23/025
384/462
(Continued)

FOREIGN PATENT DOCUMENTS

JP 2004-108388 A 4/2004
JP 2006125540 A * 5/2006 .............. F16C 33/66
(Continued)

*Primary Examiner* — Marcus Charles
(74) *Attorney, Agent, or Firm* — Oliff PLC (57) ABSTRACT

A rolling bearing apparatus includes: a bearing portion having an inner ring, an outer ring, a plurality of balls, and a cage; and a lubrication unit that is provided adjacently to an annular space formed between the inner ring and the outer ring and that has a pump that feeds a lubricant into the annular space. The pump has a main body portion having an internal space in which the lubricant is retained and being open at one end of the main body portion, a metal diaphragm fixed to a fixation portion that is a part of the main body portion so as to close the opening of the main body portion, and a piezoelectric element fixed to the diaphragm. At least the fixation portion of the main body portion is formed of metal, and the fixation portion and the diaphragm are fixed together by metal joining.

2 Claims, 6 Drawing Sheets (51) Int. Cl.
*F16C 33/58* (2006.01)
*F16N 13/00* (2006.01)
*F16C 19/16* (2006.01)

(58) Field of Classification Search
CPC .......... F04B 43/046; F04B 53/18; F16N 9/02; F16N 7/38; F16N 13/00
USPC ....... 384/462, 467, 470–471, 473, 477, 523, 384/606; 184/6.21, 6.28, 14, 26
See application file for complete search history.

(56) References Cited

U.S. PATENT DOCUMENTS

| | | | | |
|---|---|---|---|---|
| 7,832,937 | B2* | 11/2010 | Suzuki | F16C 33/6674 184/11.2 |
| 7,909,513 | B2* | 3/2011 | Ueno | F16C 19/163 384/470 |
| 8,172,462 | B2* | 5/2012 | Suzuki | F16C 33/3806 384/468 |
| 8,734,021 | B2* | 5/2014 | Suzuki | F16C 33/6674 384/473 |
| 2006/0165328 | A1 | 7/2006 | Ueno et al. | |
| 2011/0079299 | A1* | 4/2011 | Yuguchi | F16K 15/144 137/511 |
| 2011/0206306 | A1* | 8/2011 | Urano | F16J 15/162 384/473 |
| 2014/0305436 | A1* | 10/2014 | Nitta | A61M 15/0085 128/204.25 |
| 2014/0341490 | A1* | 11/2014 | Ito | F16C 33/6607 384/471 |
| 2015/0289898 | A1* | 10/2015 | Gomi | A61B 17/3203 606/170 |

FOREIGN PATENT DOCUMENTS

| | | | | |
|---|---|---|---|---|
| JP | EP-1538357 A4 | * | 12/2006 | .......... F16C 33/6618 |
| JP | WO-2007108246 A1 | * | 9/2007 | ............ F04B 43/046 |
| JP | WO-2010035862 A1 | * | 4/2010 | ............ F04B 43/046 |
| JP | 2011-033085 A | | 2/2011 | |
| JP | 2011033085 A | * | 2/2011 | ............. F16C 19/16 |
| JP | WO-2013179789 A1 | * | 12/2013 | ............ F04B 43/046 |
| JP | EP-2787230 A2 | * | 10/2014 | ............ F16C 33/664 |
| JP | EP-2306018 A4 | * | 11/2014 | ............ F04B 45/047 |
| JP | WO-2014181823 A1 | * | 11/2014 | .......... F16C 33/6674 |

* cited by examiner

ROLLING BEARING APPARATUS

INCORPORATION BY REFERENCE

The disclosure of Japanese Patent Application No. 2015-114924 filed on Jun. 5, 2015 including the specification, drawings and abstract, is incorporated herein by reference in its entirety.

BACKGROUND OF THE INVENTION

1. Field of the Invention

The invention relates to a rolling bearing apparatus including a bearing portion and a lubrication unit that feeds a slight amount of lubricant to the bearing portion.

2. Description of Related Art

Figure 5:
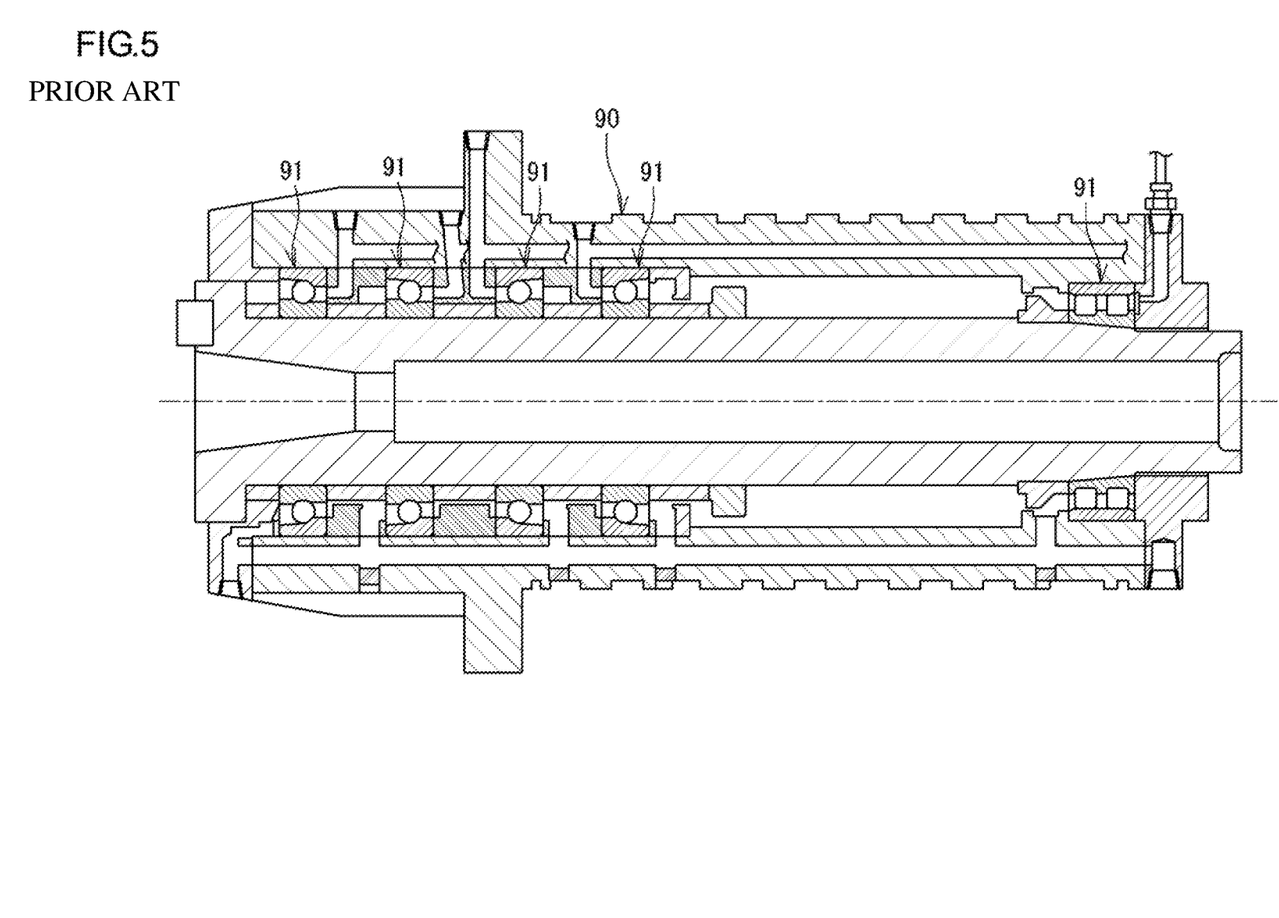
FIG. 5 is a longitudinal sectional view of a conventional main spindle apparatus.

A rolling bearing is used, for example, as a bearing for a main spindle in a machine tool. As depicted in FIG. 5, a housing 90 included in a main spindle apparatus in a machine tool is provided with a plurality of rolling bearings 91 along an axial direction. For the main spindle apparatus depicted in FIG. 5, oil air lubrication is adopted in order to provide the rolling bearings 91 with lubricity. However, the oil-air lubrication involves high running costs due to air consumption. The oil-air lubrication also needs associated facilities such as an oil air feeding apparatus and an air clean unit, which may lead to increased facility costs.

Figure 6:
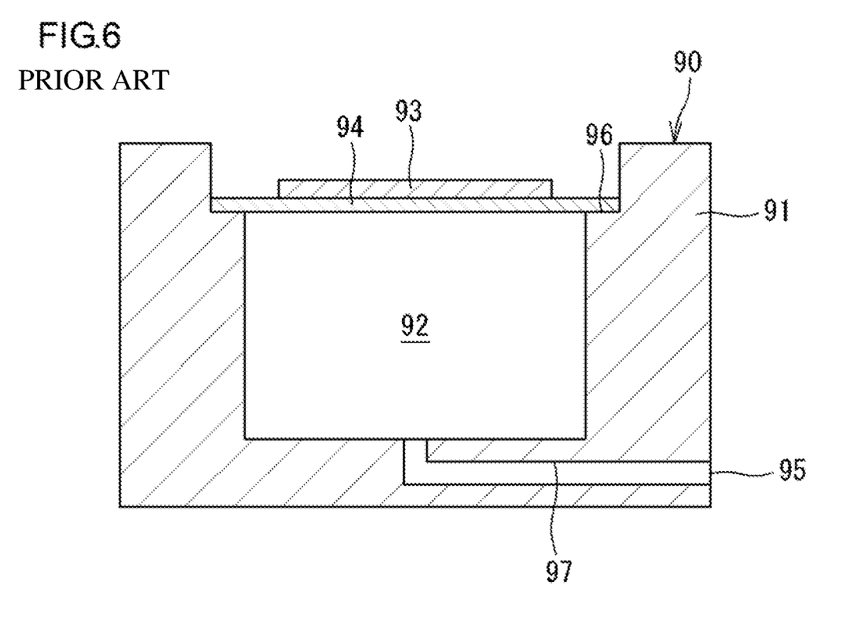
FIG. 6 is a sectional view of a conventional pump.

Thus, as another means for lubricating the rolling bearings 91, a rolling bearing apparatus with a lubrication unit assembled therein as disclosed in, for example, Japanese Patent Application Publication No. 2004-108388 (JP 2004-108388 A) is known. In this bearing apparatus, a lubrication unit is installed at an inner peripheral side of outer rings of the rolling bearings and integrated with the rolling bearings (bearing portions). The lubrication unit includes a tank in which a lubricant is retained and a pump that discharges the lubricant in the tank into an annular space between inner rings and the outer rings, An example of a pump used for the above-described bearing apparatus is depicted in FIG. 6. A pump 90 has a main body portion 91, a piezoelectric element 93, and a diaphragm 94. The main body portion 91 has an internal space 92 in which a lubricant is retained, and is open at one end of the main body portion 91. The piezoelectric element 93 is fixed to the diaphragm 94. The diaphragm 94 is fixed to a part of the main body portion 91 so as to close the opening of the main body portion 91. The piezoelectric element 93 operates to deform the diaphragm 94, thereby the volume of the internal space 92 is changed and thus the lubricant can be discharged through a nozzle 95.

As depicted in FIG. 6, a channel 97 or the like connected to the nozzle 95 is formed in the main body portion 91. The shape of the pump is complicated, and thus, the main body portion 91 is preferably formed of resin and produced by injection molding. In contrast, the diaphragm 94 is formed of a thin metal member. The main body portion 91 and the diaphragm 94 are formed of the different materials as described above, and are thus fixed together with an adhesive 96.

However, in this case, the diaphragm 94 is elastically deformed while being driven by the piezoelectric element 93. Thus, when the pump has been in use over the long term, the adhesive strength of the adhesive 96 decreases. As a result, the diaphragm 94 may be peeled off from the main body portion 91. In particular, when oil or moisture in the environment adheres to the adhesive 96, the adhesive strength may further decrease. When the diaphragm 94 is peeled off, the lubricant may leak out through the peel-off portion. Consequently, the lubricant may be inappropriately discharged.

SUMMARY OF THE INVENTION

An object of the invention is to provide a rolling bearing apparatus including a lubrication unit and that hinders a diaphragm provided in a pump in a lubrication unit from being peeled off from a main body portion provided in the pump.

According to an aspect of the invention, a rolling bearing apparatus includes: a bearing portion having an inner ring, an outer ring, a plurality of rolling elements interposed between the inner ring and the outer ring, and a cage that holds the rolling elements; and a lubrication unit that is provided adjacently to an annular space formed between the inner ring and the outer ring and that has a pump that feeds a lubricant into the annular space. The pump has a main body portion having an internal space in which the lubricant is retained and being open at one end of the main body portion, a metal diaphragm fixed to a fixation portion that is a part of the main body portion so as to close the opening of the main body portion, and a piezoelectric element fixed to the diaphragm. At least the fixation portion of the main body portion is formed of metal, and the fixation portion and the diaphragm are fixed together by metal joining.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
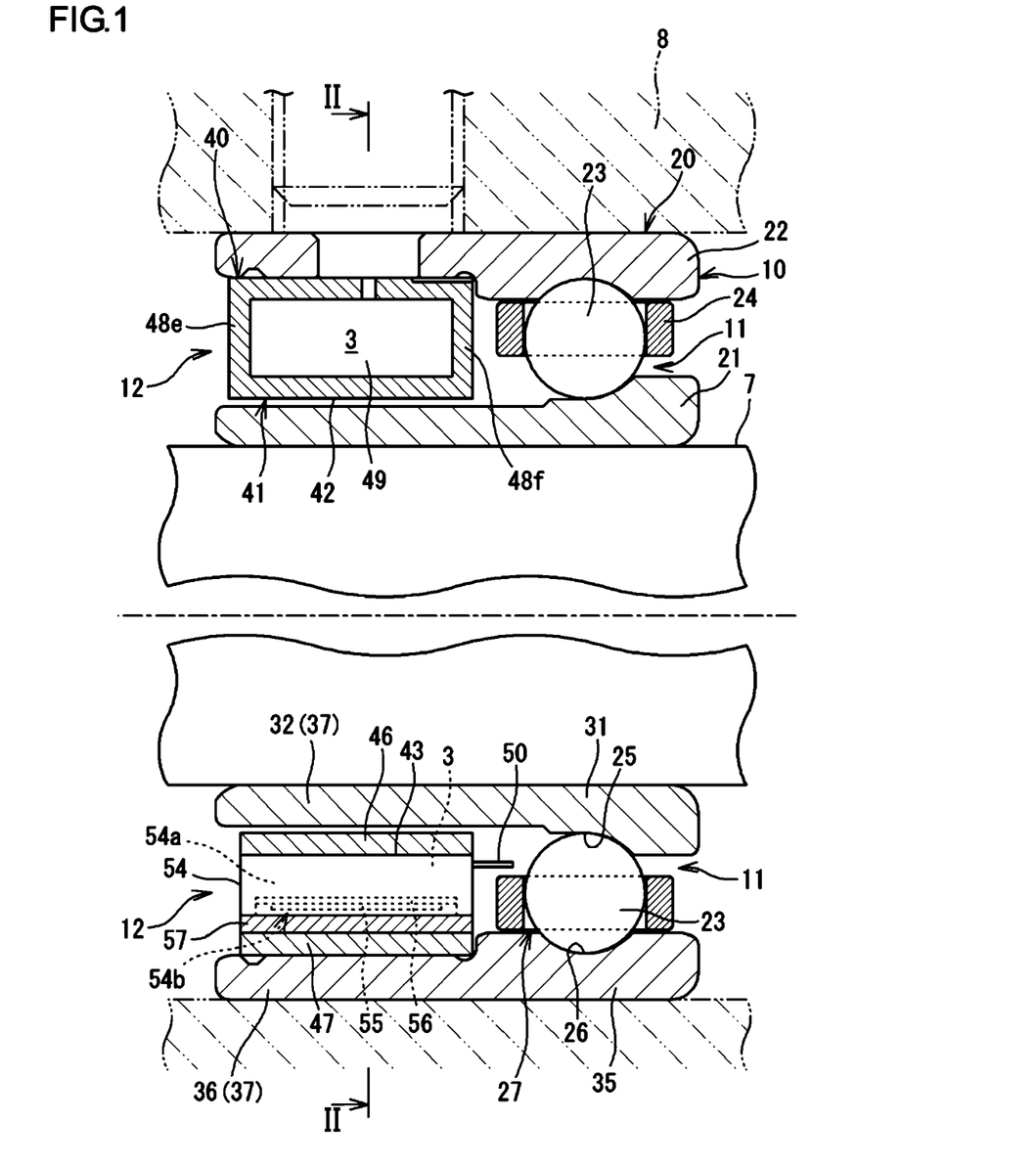
FIG. 1 is a longitudinal sectional view of a rolling bearing apparatus.

An embodiment of a rolling bearing apparatus in the invention will be described below. FIG. 1 is a longitudinal sectional view of a rolling bearing apparatus 10. The rolling bearing apparatus 10 in the present embodiment (hereinafter referred to as the bearing apparatus 10) supports a main spindle (shaft 7) in a main spindle apparatus provided in a machine tool so that the main spindle is rotatable. The bearing apparatus 10 is housed in a bearing housing 8 of the main spindle apparatus. In FIG. 1, the bearing housing 8 is depicted by a long dashed double-short dashed line. The bearing apparatus 10 includes a bearing portion 20 and a lubrication unit 40.

The bearing portion 20 has an inner ring 21, an outer ring 22, a plurality of balls (rolling elements) 23, and a cage 24 that holds the balls 23. The inner ring 21 is a cylindrical member externally fitted over the shaft 7. The inner ring 21 has an inner ring main body portion 31 on a first side in an axial direction (the right side in FIG. 1) and an inner ring extension portion 32 (the left side in FIG. 1) on a second side in the axial direction. A raceway groove (hereinafter referred to as an inner ring raceway groove 25) is formed in an outer periphery of the inner ring main body portion 31. In the present embodiment, the inner ring main body portion 31 and the inner ring extension portion 32 are integrated together and are inseparable, but the inner ring main body portion 31 and the inner ring extension portion 32 may be separated from each other. When the inner ring main body portion 31 and the inner ring extension portion 32 are separated from each other, the inner ring extension portion 32 is a spacer shaped like a short cylinder.

The outer ring 22 is a cylindrical member fixed to an inner peripheral surface of the bearing housing 8. The outer ring 22 has an outer ring main body portion 35 on the first side in an axial direction (the right side in FIG. 1) and an outer ring extension portion 36 (the left side in FIG. 1) on the second side in the axial direction. A raceway groove (hereinafter referred to as an outer ring raceway groove 26) is formed in an inner periphery of the outer ring main body portion 35. In the present embodiment, the outer ring main body portion 35 and the outer ring extension portion 36 are integrated together and are inseparable, but the outer ring main body portion 35 and the outer ring extension portion 36 may be separated from each other. When the outer ring main body portion 35 and the outer ring extension portion 36 are separated from each other, the outer ring extension portion 36 is a spacer shaped like a short cylinder.

The balls 23 are interposed between the inner ring 21 (inner ring main body portion 31) and the outer ring 22 (outer ring main body portion 35), and roll through the inner ring raceway groove 25 and the outer ring raceway groove 26. The cage 24 is an annular member and is provided with a plurality of pockets 27 along a circumferential direction. The balls 23 are housed in the respective pockets 27. Consequently, the cage 24 can hold the balls 23 such that the balls are aligned in the circumferential direction.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are continuous with each other. The balls 23 and the cage 24 are provided in the first annular space 11. The lubrication unit 40 is provided in the second annular space 12. The inner ring extension portion 32 and the outer ring extension portion 36, which form the second annular space 12, serve as a frame 37 in which a tank 42 included in the lubrication unit 40 described below is housed.

In the present embodiment, the inner ring 21 rotates along with the shaft 7 with respect to the outer ring 22. The lubrication unit 40 is attached to an inner peripheral surface of the outer ring extension portion 36 so as to be closely fitted on the inner peripheral surface. In contrast, a slight space is provided between an outer peripheral surface of the inner ring extension portion 32 and an inner peripheral surface of the lubrication unit 40 (an annular holder 41 described below), so that rotation of the inner ring 21 is not hindered by the lubrication unit 40.

Figure 2:
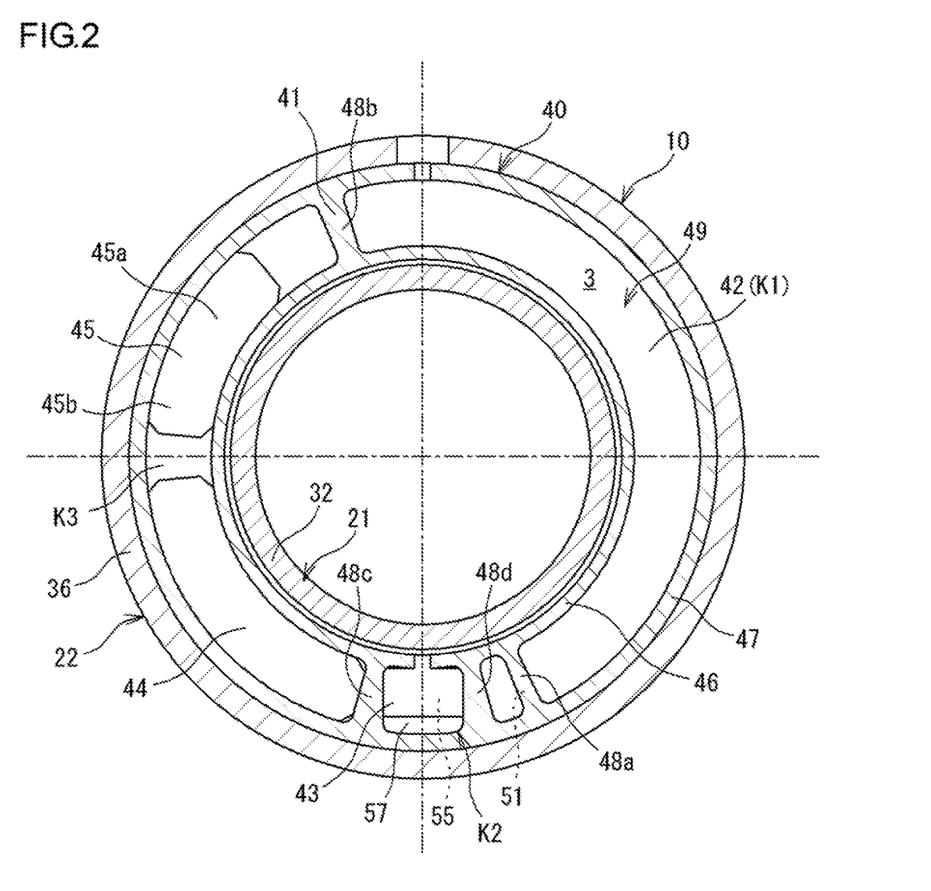
FIG. 2 is a transverse sectional view of the rolling bearing apparatus depicted in FIG. 1.

FIG. 2 is a sectional view taken along line A-A in FIG. 1. The lubrication unit 40 is shaped generally like a ring. The lubrication unit 40 includes the holder 41, the tank 42, and a pump 43, and further includes a circuit portion 44 and a power supply portion 45. The lubrication unit 40 includes a cover 57 for the pump 43.

The holder 41 is, for example, an annular member formed of resin. The holder 41 has an inner wall 46a shaped like short cylinder, an outer wall 47 shaped like a short cylinder, a plurality of partition walls 48a, 48b, 48c, and 48d, and sidewalls 48e and 48f (see FIG. 1). The partition walls 48a, 48b, 48c, and 48d are provided between the inner wall 46 and the outer wall 47. The inner wall 46 is a wall present on a radially inner side of the holder 41, and the outer wall 47 is a wall present on a radially outer side of the holder 41. The walls forms a plurality of spaces K1, K2, and K3 along the circumferential direction as depicted in FIG. 2.

In the present embodiment, the first space K1 constitutes the tank 42. The pump 43 is stored in the second space K2. The circuit portion 44 and the power supply portion 45 are stored in the third space K3. Consequently, the lubrication unit 40, including the holder 41, the tank 42, the pump 43, the circuit portion 44, and the power supply portion 45, is integrally configured. The lubrication unit 40 is mounted in the outer ring extension portion 36 so as to be integrated with the bearing portion 20. As depicted in FIG. 1, the lubrication unit 40, provided in the second annular space 12, is located adjacently to the first annular space 11 in the axial direction.

In FIG. 1, the tank 42 is configured to retain a lubricant 3 to be fed into the first annular space 11, and has a retention portion 49 in which the lubricant 3 is retained. In the present embodiment, as depicted in FIG. 2, the retention portion 49 corresponds to a space enclosed by a part of the inner wall 46, a part of the outer wall 47, the partition walls 48a and 48b, and the sidewalls 48e and 48f (see FIG. 1). The sidewall 48e may be removable.

The tank 42 has an outflow portion 51 (see FIG. 2) provided in a part of the tank 42 to allow the lubricant 3 in the retention portion 49 to flow to the pump 43. The outflow portion 51 and the pump 43 are connected together through a channel (not depicted in the drawings). In the tank 42, a holding body that holds the lubricant 3 (for example, a felt or a sponge) may be provided. As described above, the tank 42 enables retention of the lubricant 3 therein and feeding of the retained lubricant 3 to the pump 43.

In FIG. 1, the pump 43 is configured to feed (discharge) the lubricant 3 fed from the tank 42 into the first annular space 11. The pump 43 in the present embodiment has a piezoelectric element 55. The piezoelectric element 55 operates to change the volume of an internal space 54a in the pump 43, allowing the lubricant 3 in the internal space 54a to be discharged through a nozzle 50.

In FIG. 2, the power supply portion 45 has a generation portion 45a and a secondary battery portion 45b. The generation portion 45a is configured to be enabled to generate power by rotation of the inner ring 21. The resultant power is stored in the secondary battery portion 45b. The circuit portion 44 is a circuit board including a programmed microcomputer and transmits a control signal (driving signal) to the pump 43. In other words, the circuit portion 44 provides driving electric power to (applies a predetermined voltage to) the piezoelectric element 55.

Figure 3:
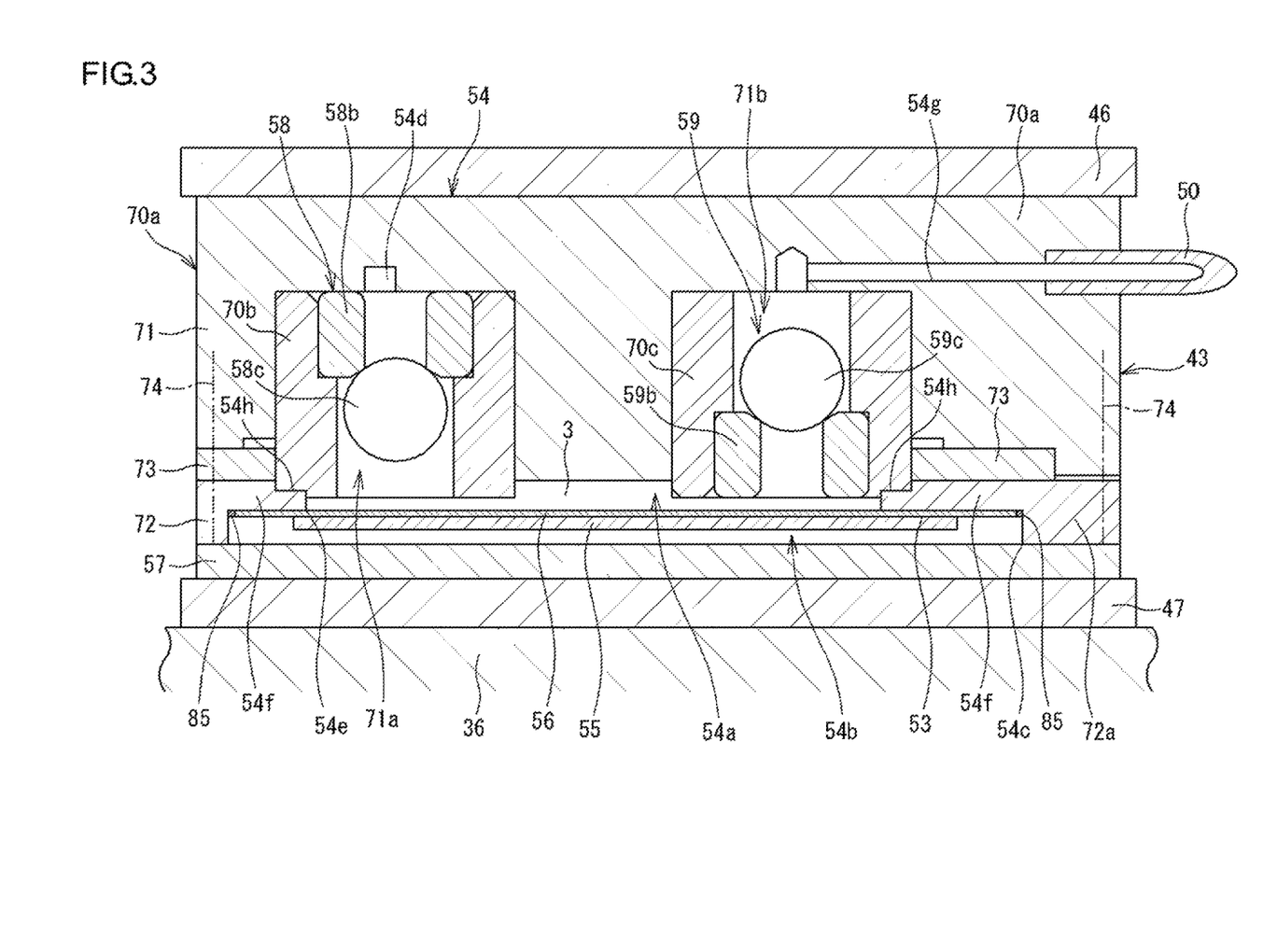
FIG. 3 is a sectional view of a pump.

The pump 43 will be further described. FIG. 3 is a sectional view of the pump 43 depicted in FIG. 1. The pump 43 has the piezoelectric element 55, a diaphragm 56, a main body portion 54, a first valve portion 58, and a second valve portion 59. The piezoelectric element 55 operates to discharge the lubricant 3.

The main body portion 54 has a first member 71 and a second member 72. The diaphragm 56 is attached to the second member 72. The first member 71 and the second member 72 are fastened together via machine screws (fastening member) 74. The main body portion 54 has a seal member 73 interposed between the first member 71 and the second member 72 in order to prevent the lubricant 3 in the pump 43 from leaking from between the first member 71 and the second member 72.

The first member 71 in the present embodiment has a case 70a and a pair of tube portions 70b and 70c. Two recessed portions 71a and 71b are formed in the case 70a. The first tube portion 70b is mounted in the recessed portion 71a. The second tube portion 70c is mounted in the other recessed portion 71b. The first valve portion 58 is provided in the first tube portion 70b. The second valve portion 59 is provided in the second tube portion 70c.

Figure 4:
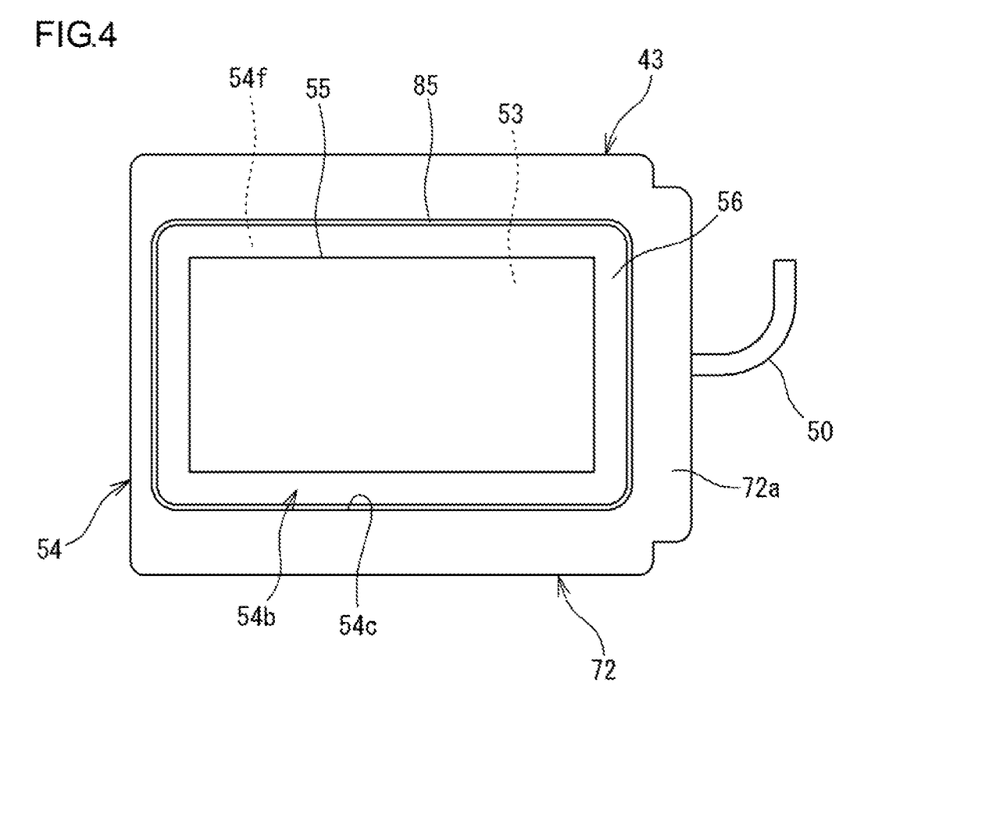
FIG. 4 is a diagram illustrating the pump as viewed from a radially outer side.

FIG. 4 is a diagram illustrating the pump 43 as viewed from an outer side thereof in the radial direction. As depicted in FIG. 3 and FIG. 4, the second member 72 in the present embodiment is shaped like a generally rectangular ring (see FIG. 4), and has a peripheral wall portion 72a. The peripheral wall portion 72a is provided to surround the entire circumference of the piezoelectric element 55 bonded to the diaphragm 56. The peripheral wall portion 72a forms a small space 54b. In other words, an area surrounded by the peripheral wall portion 72a corresponds to the small space 54b. The seal member 73 is also annular so as to conform to the shape of the second member 72.

With the first member 71 and the second member 72 assembled together (with the seal member 73 sandwiched between the first and second members 71 and 72), the main body portion 54 of the pump 43 is open (54e) at the second member 72 side of the main body portion 54 (see FIG. 3). The opening 54e is closed by the diaphragm 56. The internal space 54a in the first member 71 closed by the diaphragm 56 serves as a space in the pump 43 in which the lubricant 3 is retained. The small space 54b in which the piezoelectric element 55 is housed corresponds to a space that is surrounded by the diaphragm 56 and the peripheral wall portion 72a of the second member 72 and that is open at one side of the space (at the outer wall 47 side). The cover 57 closes the opening 54c of the small space 54b, which is open at one side (at the outer wall 47 side) so as to cover the piezoelectric element 55 bonded to the diaphragm 56.

As described above, the pump 43 has the main body portion 54 and the diaphragm 56 in addition to the piezoelectric element 55. The main body portion 54 has the internal space 54a in which the lubricant 3 is retained and the small space 54b in which the piezoelectric element 55 is housed. The diaphragm 56 is configured to define the small space 54b and the internal space 54a.

The diaphragm 56 is formed of metal (in the present embodiment, phosphor bronze), that is, a material different from the material of the piezoelectric element 55. Thus, the piezoelectric element 55 is bonded (fixed) to the diaphragm 56 with the adhesive 53. The piezoelectric element 55 operates to allow the diaphragm 56 to be elastically deformed so as to reduce the volume of the internal space 54a. Consequently, the lubricant 3 in the internal space 54a is discharged through the nozzle 50. When the pump 43 is used, the internal space 54a is filled with the lubricant 3.

The first valve portion 58 and the second valve portion 59 will be described. In FIG. 3, the first valve portion 58 has an inner tube 58a and a ball 58c. The inner tube 58b is provided at an inner peripheral side of the tube portion 70b included in the first member 71. The ball 58c is pressed against the inner tube 58b by a spring not depicted in the drawings. The first valve portion 58 functions as a check valve that prevents the lubricant 3 flowing from the internal space 54a toward the tank 42 (see FIG. 1) through a channel 54d. The second valve portion 59 has an inner tube 59b and a ball 59c, The inner tube 59b is provided at an inner peripheral side of the tube portion 70c included in the first member 71. The ball 59c is pressed against the inner tube 59b by a spring not depicted in the drawings. The second valve portion 59 functions as a check valve that prevents the lubricant 3 flowing from the nozzle 50 side to the internal space 54a.

The piezoelectric element 55 operates to elastically deform the diaphragm 56 to reduce the volume of the internal space 54a. The internal pressure of the internal space 54a (an increase in the internal pressure) allows the ball 59c in the second valve portion 59 to be separated from the inner tube 59b against the bias force of the spring not depicted in the drawings. Consequently, the lubricant 3 in the internal space 54a is discharged to the exterior of the pump 43 through the nozzle 50. The tube portion 70c has a function to guide the ball 59c when the ball 59c moves. Stopping the operation of the piezoelectric element 55 releases the elastic deformation of the diaphragm 56. At this time, the internal pressure of the internal space 54a (a decrease in the internal pressure) allows the ball 58c in the first valve portion 58 to be separated from the inner tube 58b against the bias force of the spring not depicted in the drawings. Thus, the lubricant 3 is fed into the internal space 54a through the channel 54d communicating with the tank 42 (see FIG. 1). The tube portion 70b has a function to guide the ball 58c when the ball 58c moves. Such operations are repeated to enable the pump 43 to feed a slight amount of lubricant 3 to be fed into the first annular space 11 (see FIG. 1).

As described above, the pump 43 in the present embodiment has the main body portion 54, the diaphragm 56, and the piezoelectric element 55. The main body portion 54 has the internal space 54a in which the lubricant 3 is retained. The main body portion 54 is open (54e) at one side thereof (the second member 72 side). The diaphragm 56 is fixed to a part of the main body portion 54 so as to close the opening 54e of the main body portion 54. The part of the main body portion 54 to which the diaphragm 56 is fixed is referred to as a fixation portion 54f.

A configuration of the main body portion 54 of the pump 43 and an attachment structure in which the diaphragm 56 is attached to the main body portion 54 will be further described. As described above, the main body portion 54 has the first member 71, the second member 72, and the seal member 73. The second member 72 is a member separate from the first member 71. The seal member 73 is interposed between the first member 71 and the second member 72.

In FIG. 3, the case 70a of the first member 71 is provided with the valve portions 58 and 59 so as to configure the internal space 54a that is closed while the piezoelectric element 55 is not driven. Besides the recessed portions 71a and 71b in which the valve portions 58 and 59 and the tube portions 70b and 70c are provided, the case 70a has the channel 54d connecting the tank 42 (see FIG. 1) and the internal space 54a together and a channel 54g connecting the internal space 54a and the nozzle 50 together. In other words, the case 70a has a complicated shape. In contrast, the second member 72 has a simple shape as compared to the case 70a (the first member 71). In other words, the second member 72 is generally annular and has the peripheral wall portion 72a. The second member 72 has the fixation portion 54f so that the diaphragm 56 is fixed to the second member 72. The fixation portion 54f is annular, and the peripheral wall portion 72a is erected from an edge of the fixation portion 54f all around the circumference thereof.

The diaphragm 56 is fixed to the second member 72 by metal joining. The diaphragm 56 is a plate-like member formed of a thin metal (in the present embodiment, phosphor bronze) so as to achieve the function of the diaphragm 56, in other words, so as to be easily elastically deformed in accordance with driving of the piezoelectric element 55. To allow the diaphragm 56 to be fixed to the second member 72 by metal joining, at least the fixation portion 54f of the second member 72 is formed of metal. In the present embodiment, the whole second member 72 including the fixation portion 54f is formed of metal, and the second member 72 is formed of the same material as that of the diaphragm 56 (phosphor bronze).

With the diaphragm 56 placed on one side of the fixation portion 54f, a molten metal material 85 is provided along a boundary between the fixation portion 54f and the diaphragm 56. The metal material 85 is solidified to integrate the diaphragm 56 and the fixation portion 54f (the second member 72). In other words, the metal material 85 is welded between the diaphragm 56 and the fixation portion 54f to join the diaphragm 56 and the fixation portion 54f together (brazing).

As described above, in the pump 43 in the present embodiment, the second member 72 of the main body portion 54 is formed of metal. The fixation portion 54f of the second member 72 and the diaphragm 56 are fixed together by metal joining. The pump may be optionally configured so long as at least the fixation portion 54f of the main body portion 54 is formed of metal and the fixation portion 54f and the diaphragm 56 are fixed together by metal joining. As compared to a conventional configuration in which the diaphragm 56 is fixed with an adhesive, the present configuration hinders the diaphragm 56 from being peeled off from the fixation portion 54f even when the pump has been in use over the long term. As a result, durability of the lubrication unit 40 and thus of the bearing apparatus 10 can be enhanced.

In the present embodiment, the second member 72 to which the diaphragm 56 is fixed by meta joining is a member separate from the first member 71. This facilitates shaping of the main body portion 54 (particularly the case 70a of the first member 71). The case 70a needs to be provided with the recessed portions 71a and 71b and the channels 54d and 54g, and thus has a complicated shape. If the case 70a (the first member 71) is formed of metal similarly to the second member 72, foaming the recessed portions 71a and 71b and the channels 54d and 54g is difficult. When the thus configured case 70a is formed of resin and produced by injection molding, shaping of the case 70a is relatively easy. The tube portions 70b and 70c of the first member 71 may be formed of metal or resin. In the present embodiment, the tube portions 70b and 70c are separate from the case 70a, but may be integrated with the case 70a.

When the first member 71 and the second member 72 are separate from each other, shaping of the case 70a is facilitated. However, in this case, with the first member 71 and the second member 72 assembled together, the lubricant 3 in the internal space 54a may leak from between the first member 71 and the second member 72. The present embodiment, however, is provided with the seal member 73, which allows the leakage to be prevented.

As depicted in FIG. 3, the pump 43 has the machine screws 74 as described above, which serve as fastening members for fixing the case 70a of the first member 71 to the second member 72. The machine screws 74 are provided at the respective positions along a circumferential direction of the second member 72. The machine screws 74 fixedly tightens the case 70a of the first member 71 and the second member 72 together in such a direction that the case 70a and the second member 72 are brought close to each other.

As described above, the seal member 73 is interposed between the first member 71 and the second member 72. Consequently, the amount of elastic deformation of the seal member 73 locally varies according to the degree of the above-described tightening. Because of this, an amount of compression (amount of tightening) of the seal member may vary or setting the volume of the internal space 54a to a predetermined value may be difficult. In the main body portion 54 provided in the pump 43 in the present embodiment, the first member 71 and the second member 72 are tightened with the machine screws 74 in such a direction that the first member 71 and the second member 72 are brought close to each other. When the seal member 73 is elastically deformed by a predetermined amount of compression, the tube portions 70b and 70c of the first member 71 come into contact with the fixation portion 54f of the second member 72. In FIG. 3, a part of the fixation portion 54f serves as an abutting contact portion 54h that comes into contact with the tube portions 70b and 70c.

As described above, the first member 71 and the second member 72 are fixedly tightened with the machine screws 74 in such a direction that the first member 71 and the second member 72 are brought close to each other. A part of the second member 72 (the fixation portion 54f) comes into contact with a part of the first member 71 (the tube portions 70b and 70c). Consequently, the main body portion 54 is configured so as to allow the first member 71 and the second member 72 to be positioned relative to each other in the direction of the tightening. Thus, even if the degree of the tightening with the machine screws 74 varies, the amount of compression of the seal member 73 is constant. Furthermore, a set value for the volume of the internal space 54a is easily achieved.

The embodiment as disclosed above is illustrative in every respect and is not restrictive. In other words, the rolling bearing apparatus 10 in the invention is not limited to the illustrated forms but may be in any other form within the scope of the invention. For example, the diaphragm 56 may be formed of any other metal material, for example, brass. In this case, the second member 72 (the fixation portion 54f) is preferably formed of the same metal material (brass) as that of the diaphragm 56. The metal material 85 used to join the diaphragm 56 and the second member 72 together is preferably the same metal material (brass). The metal joining between the diaphragm 56 and the second member 72 may be joining other than brazing, which does not involve significant melting of the base material (the diaphragm 56 and the fixation portion 54f). For example, press fitting or metallurgical joining such as welding (fusion welding) involving melting of the base material (the diaphragm 56 and the fixation portion 54f) (fusion welding) may be adopted.

In the above-described embodiment, the inner ring 21 is a rotating ring, and the outer ring 22 is a fixed ring. However, the outer ring 22 may be a rotating ring, and the inner ring 21 may be a fixed ring. In this case, the lubrication unit 40 is fixed to the inner ring 21. In the above description, the lubrication unit 40 includes the circuit portion 44 and the power supply portion 45 in the holder 41. However, one or both of the circuit portion 44 and the power supply portion 45 may be provided outside the holder 41. In this case, the pump 43 in the holder 41 and the exterior of the holder 41 are connected together through a cable. The bearing portion 20 may be other than a ball bearing and may be a roller bearing including rollers (cylindrical rollers or tapered rollers) as rolling elements.

In the invention, the main body portion (fixation portion) of the pump provided in the lubrication unit and the diaphragm are fixed together by metal joining. Thus, as compared to a conventional configuration in which the main body portion (fixation portion) and the diaphragm are fixed together with an adhesive, the present configuration hinders the main body portion and the diaphragm from separate from each other even when the apparatus has been in use over the long term. As a result, durability of the rolling bearing apparatus can be enhanced.

What is claimed is:

1. A rolling bearing apparatus comprising:
    a bearing portion having an inner ring, an outer ring, a plurality of rolling elements interposed between the inner ring and the outer ring, and a cage that holds the rolling elements; and
    a lubrication unit that is provided adjacently to an annular space formed between the inner ring and the outer ring and that has a pump that feeds a lubricant into the annular space, wherein
    the pump has a main body portion having an internal space in which the lubricant is retained and being open at one end of the main body portion, a metal diaphragm fixed to a fixation portion that is a part of the main body portion so as to close the opening of the main body portion, and a piezoelectric element fixed to the diaphragm,
    at least the fixation portion of the main body portion is formed of metal, and the fixation portion and the diaphragm are fixed together by metal joining, and
    the main body portion has a first member that configures the internal space, a second member that is a member separate from the first member and that includes the fixation portion, and a seal member interposed between the first member and the second member.

2. The rolling bearing apparatus according to claim 1, wherein
    the pump further has a fastening member that fixedly tightens the first member and the second member in such a direction that the first member and the second member are brought close to each other,
    a part of the second member comes into contact with a part of the first member to allow the first member and the second member to be positioned relative to each other in a direction of the tightening.

* * * * *